US012580117B2

(12) United States Patent
Kazuta et al.

(10) Patent No.: US 12,580,117 B2
(45) Date of Patent: Mar. 17, 2026

(54) MULTILAYER COIL COMPONENT

(71) Applicant: TDK CORPORATION, Tokyo (JP)

(72) Inventors: Youichi Kazuta, Tokyo (JP); Kazuya Tobita, Tokyo (JP); Yuto Shiga, Tokyo (JP); Yuichi Takubo, Tokyo (JP); Junichiro Urabe, Tokyo (JP); Noriaki Hamachi, Tokyo (JP); Toshinori Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1016 days.

(21) Appl. No.: 17/694,971

(22) Filed: Mar. 15, 2022

(65) Prior Publication Data

US 2022/0310305 A1 Sep. 29, 2022

(30) Foreign Application Priority Data

Mar. 25, 2021 (JP) ................................ 2021-051866

(51) Int. Cl.

| | |
|---|---|
| ***H01F 27/29*** | (2006.01) |
| ***H01F 27/28*** | (2006.01) |
| ***H01F 27/32*** | (2006.01) |
| ***H01F 41/04*** | (2006.01) |

(52) U.S. Cl.

CPC ......... *H01F 27/2804* (2013.01); *H01F 27/29* (2013.01); *H01F 27/323* (2013.01); *H01F 41/041* (2013.01); *H01F 2027/2809* (2013.01)

(58) Field of Classification Search

CPC .... H01F 27/2804; H01F 27/29; H01F 27/323; H01F 41/041; H01F 2027/2809; H01F 27/292; H01F 17/0013; H01F 17/04; H01F 27/34

USPC ........................................... 336/83, 192, 200

See application file for complete search history.

(56) References Cited

U.S. PATENT DOCUMENTS

| | | | | |
|---|---|---|---|---|
| 10,475,570 | B2 * | 11/2019 | Kido | H01F 27/292 |
| 11,605,498 | B2 * | 3/2023 | Kazuta | H01F 17/0013 |
| 2017/0256352 | A1 * | 9/2017 | Kido | H01F 27/2804 |
| 2019/0164684 | A1 * | 5/2019 | Hirukawa | H01F 27/292 |
| 2020/0035405 | A1 | 1/2020 | Kido | |
| 2020/0343039 | A1 | 10/2020 | Kido | |

FOREIGN PATENT DOCUMENTS

| | | | | |
|---|---|---|---|---|
| CN | 103219129 A * | 7/2013 | | H01F 17/00 |
| CN | 107154300 A | 9/2017 | | |
| JP | 2019-016642 A | 1/2019 | | |

* cited by examiner

*Primary Examiner* — Tuyen T Nguyen
(74) *Attorney, Agent, or Firm* — OLIFF PLC

(57) ABSTRACT

A multilayer coil component 1 includes an element body 2, a coil 5, a first terminal electrode 3, a second terminal electrode 4, a first connecting conductor 6, and a second connecting conductor 7. The first connecting conductor 6 extends along a first direction D1 and has a third side 6*c* intersecting with a second direction D2 and a third direction D3 in a cross section orthogonal to the extension direction. The coil 5 faces the third side 6*c* of the first connecting conductor 6 when viewed from the first direction D1, and a side 5*a* facing the third side 6*c* is parallel to the third side 6*c* at the part that faces the third side 6*c* of the first connecting conductor 6.

4 Claims, 12 Drawing Sheets

MULTILAYER COIL COMPONENT

TECHNICAL FIELD

The present invention relates to a multilayer coil component.

BACKGROUND

The multilayer coil component described in, for example, Patent Literature 1 (Japanese Unexamined Patent Publication No. 2019-16642) is known as a multilayer coil component of the related art. The multilayer coil component described in Patent Literature 1 includes a laminate in which a plurality of units are laminated, a plurality of base material layers are laminated in the unit, which has a first main surface and a second main surface, a groove is formed in the first main surface of the unit, the depth of the groove is at least one of the base material layers, a hole reaching the second main surface is formed in the bottom portion of the groove in at least one of the units, and the plurality of units are laminated with each of the groove and the hole filled with a conductor. As a result, the conductor with which the hole of one adjacent unit is filled and the conductor with which the groove of another adjacent unit is filled are connected and the conductors are spirally connected to the inside of the laminate with the unit lamination direction as an axis.

SUMMARY

In the multilayer coil component, an increase in coil diameter is desired so that characteristics are improved. However, an increase in coil diameter in a configuration in which a connecting conductor is disposed in an element body leads to a decrease in the distance between the connecting conductor and the coil. As a result, the stray capacitance (parasitic capacitance) formed by the coil and the connecting conductor may increase. As for coil characteristics, an increase in the stray capacitance generated between the turn of the coil and the connecting conductor results in a decrease in self-resonant frequency (SRF) and a decrease in quality factor (Q) value. Accordingly, a certain distance needs to be ensured between the coil and the connecting conductor. Meanwhile, an increase in the distance between the connecting conductor and the coil leads to a decrease in the inner diameter of the coil, and then characteristics cannot be improved.

Conceivable regarding the above problems is a coil that is shaped along the outer shape of a connecting conductor at the part where the coil and the connecting conductor face each other so that the distance between the connecting conductor and the coil is ensured and the diameter of the coil is increased at the same time. In this case, it possible to maximize the diameter of the coil while maintaining a certain distance between the connecting conductor and the coil. However, in a configuration in which a connecting conductor (conductor) is prismatic as in the multilayer coil component of the related art, a coil is provided with a corner portion on condition that the coil is shaped along the outer shape of the connecting conductor. In this case, magnetic flux concentration on the corner portion results in magnetic saturation, and then a decline in direct current superimposition characteristics may arise.

One aspect of the present invention is to provide a multilayer coil component capable of suppressing the generation of stray capacitance and improving characteristics.

A multilayer coil component according to one aspect of the present invention includes: an element body formed by laminating a plurality of insulator layers and having a pair of end surfaces facing each other, a pair of main surfaces facing each other, and a pair of side surfaces facing each other, one of the main surfaces being a mounting surface; a coil disposed in the element body and having a coil axis extending along a first direction in which the pair of main surfaces face each other; a first terminal electrode and a second terminal electrode connected to the coil and disposed on the mounting surface; a first connecting conductor disposed outside the coil in the element body when viewed from the first direction and connecting one end of the coil positioned on the other main surface side and the first terminal electrode; and a second connecting conductor connecting the other end of the coil positioned on the one main surface side and the second terminal electrode, in which the first connecting conductor extends along the first direction and has a first hypotenuse intersecting with a second direction as a facing direction of the pair of end surfaces and a third direction as a facing direction of the pair of side surfaces in a cross section orthogonal to the extension direction, and the coil faces the first hypotenuse of the first connecting conductor when viewed from the first direction and a side facing the first hypotenuse is parallel to the first hypotenuse at a part facing the first hypotenuse of the first connecting conductor.

In the multilayer coil component according to one aspect of the present invention, the first connecting conductor connects one end of the coil positioned on the other main surface side and the first terminal electrode and extends along the first direction. In this configuration, the area (region) where the first connecting conductor and the coil face each other becomes large, and thus the effect of stray capacitance on characteristics may increase. In the multilayer coil component, the coil faces the first hypotenuse of the first connecting conductor when viewed from the first direction. At the part that faces the first hypotenuse of the first connecting conductor, the side facing the first hypotenuse is parallel to the first hypotenuse. Accordingly, in the multilayer coil component, a certain distance can be ensured between the first connecting conductor and the coil, and thus stray capacitance formation between the coil and the first connecting conductor can be suppressed. In addition, in this configuration, the diameter of the coil can be increased. Further, in the multilayer coil component, no corner portion is formed at the part where the coil faces the first connecting conductor. Accordingly, in the multilayer coil component, a decline in direct current superimposition characteristics attributable to magnetic flux concentration in the corner portion can be suppressed. Accordingly, in the multilayer coil component, the generation of stray capacitance can be suppressed and the characteristics can be improved.

In one embodiment, the first terminal electrode may have a rectangular shape when viewed from the first direction and be disposed such that each side is parallel to the end surface or the side surface, the first connecting conductor may have at least three sides including the first hypotenuse, and the two sides of the first connecting conductor other than the first hypotenuse may be parallel to the respective sides of the first terminal electrode. In this configuration, the inner diameter of the coil can be increased.

In one embodiment, the second connecting conductor may extend along the first direction and have a second hypotenuse intersecting with the second direction and the third direction in a cross section orthogonal to the extension direction, and the coil may face the second hypotenuse of the second connecting conductor when viewed from the first direction and a side facing the second hypotenuse may be parallel to the second hypotenuse at a part facing the second hypotenuse of the second connecting conductor. In this configuration, a certain distance can be ensured between the second connecting conductor and the coil, and thus stray capacitance formation between the coil and the second connecting conductor can be suppressed.

In one embodiment, each of the first connecting conductor and the second connecting conductor may have a triangular shape in a cross section orthogonal to the extension direction.

According to one aspect of the present invention, the generation of stray capacitance can be suppressed and characteristics can be improved.

DETAILED DESCRIPTION

Figure 1:
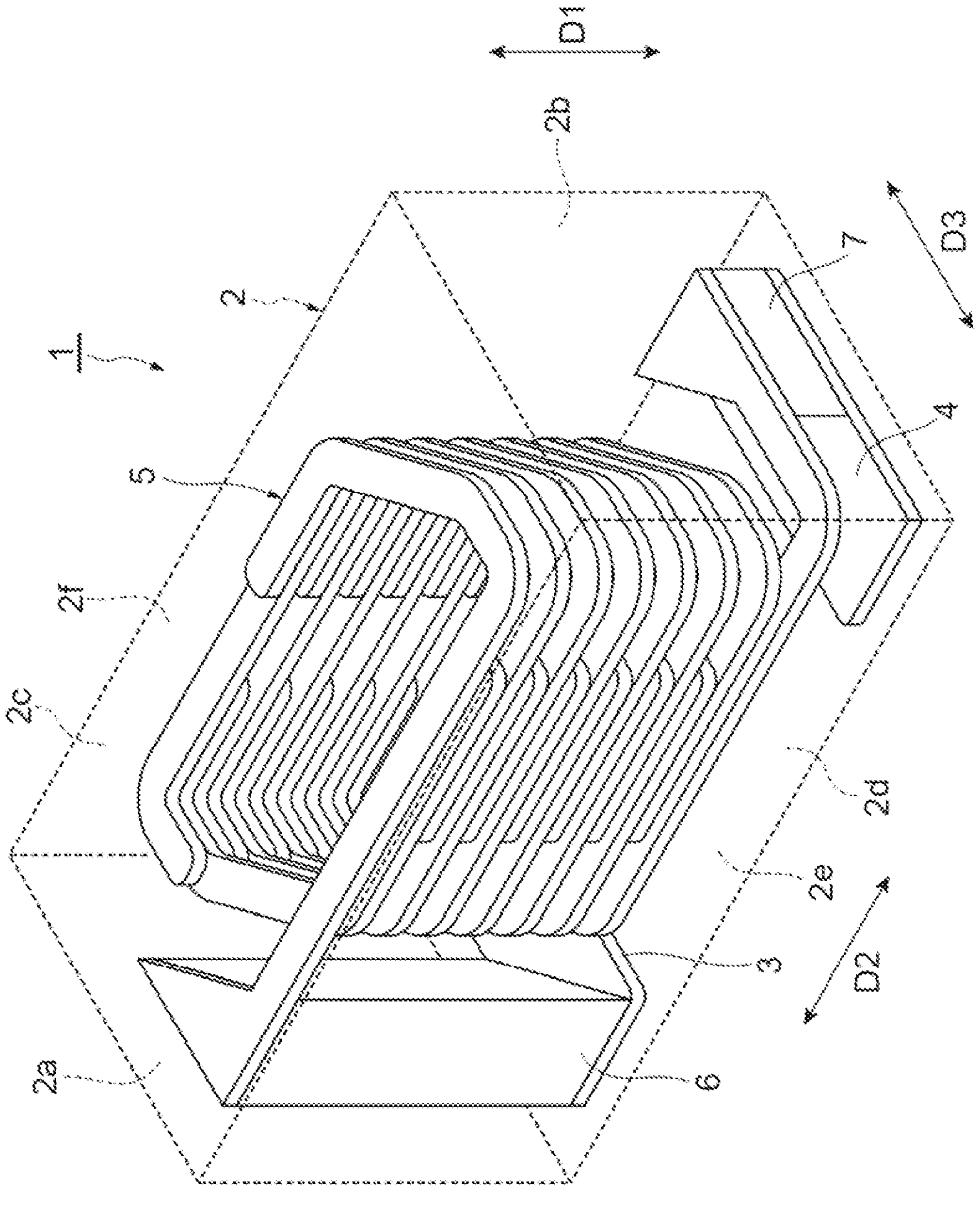
FIG. 1 is a perspective view of a multilayer coil component according to a first embodiment.

Hereinafter, preferred embodiments of the present invention will be described in detail with reference to the accompanying drawings. In the description of the drawings, the same or equivalent elements are denoted by the same reference numerals with redundant description omitted.

First Embodiment

Figure 2:
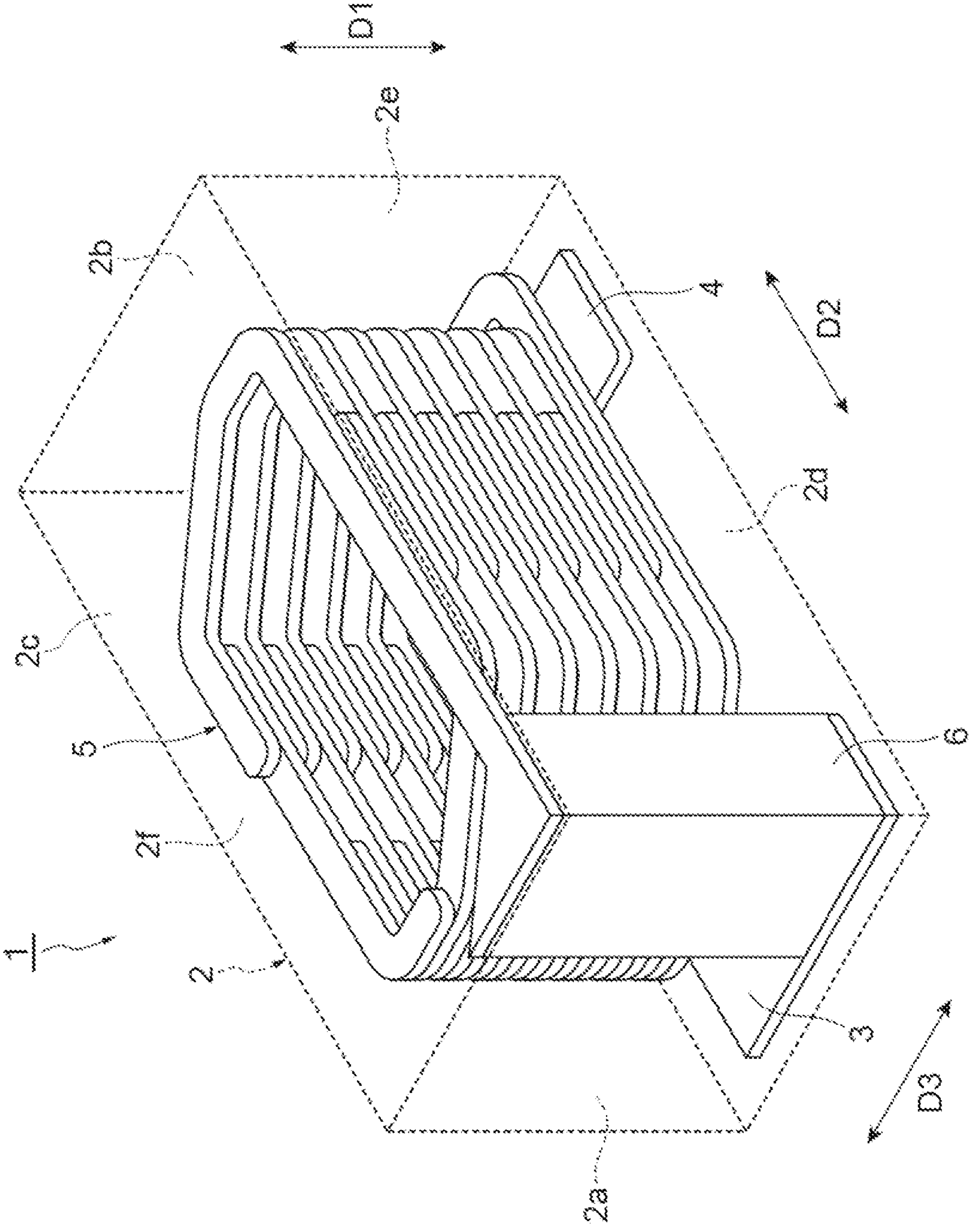
FIG. 2 is a perspective view of the multilayer coil component illustrated in FIG. 1.
Figure 3:
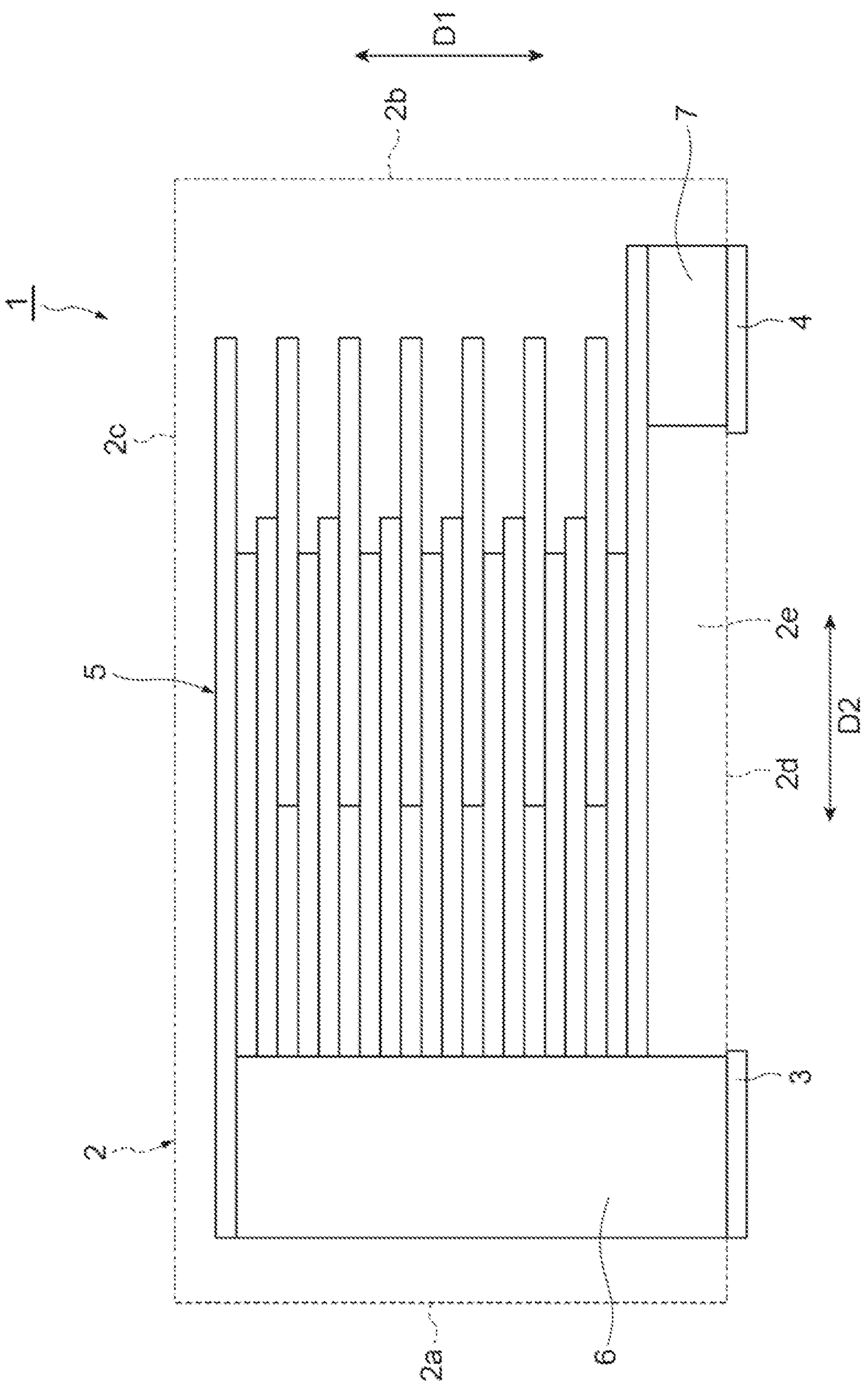
FIG. 3 is a side view of the multilayer coil component illustrated in FIG. 1.
Figure 4:
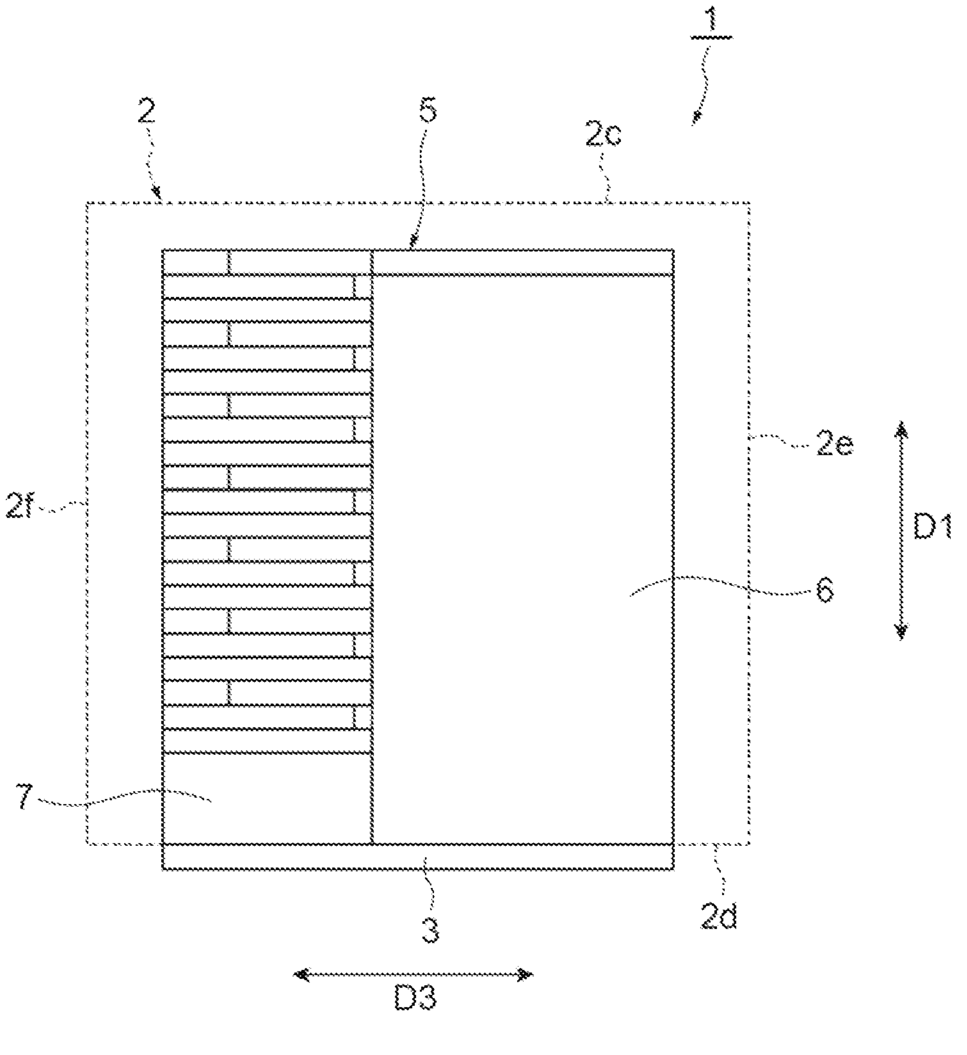
FIG. 4 is an end view of the multilayer coil component illustrated in FIG. 1.

A multilayer coil component according to a first embodiment will be described with reference to FIGS. 1 to 4. FIG. 1 is a perspective view of the multilayer coil component according to the first embodiment. FIG. 2 is a perspective view of the multilayer coil component illustrated in FIG. 1. FIG. 3 is a side view of the multilayer coil component illustrated in FIG. 1. FIG. 4 is an end view of the multilayer coil illustrated in FIG. 1. As illustrated in FIGS. 1 to 4, a multilayer coil component 1 according to the first embodiment includes an element body 2, a first terminal electrode 3, a second terminal electrode 4, a coil 5, a first connecting conductor 6, and a second connecting conductor 7. In FIGS. 1 to 4, the element body 2 is indicated by a dashed line for convenience of description.

The element body 2 has a rectangular parallelepiped shape. The rectangular parallelepiped shape includes a rectangular parallelepiped shape in which the corner and ridge portions are chamfered and a rectangular parallelepiped shape in which the corner and ridge portions are rounded. The element body 2 has a pair of end surfaces 2*a* and 2*b*, a pair of main surfaces 2*c* and 2*d*, and a pair of side surfaces 2*e* and 2*f* as outer surfaces. The end surfaces 2*a* and 2*b* face each other. The main surfaces 2*c* and 2*d* face each other. The side surfaces 2*e* and 2*f* face each other. In the following description, the direction in which the main surfaces 2*c* and 2*d* face each other is a first direction D1, the direction in which the end surfaces 2*a* and 2*b* face each other is a second direction D2, and the direction in which the side surfaces 2*e* and 2*f* face each other is a third direction D3. The first direction D1, the second direction D2, and the third direction D3 are substantially orthogonal to each other.

The end surfaces 2*a* and 2*b* extend in the first direction D1 so as to connect the main surfaces 2*c* and 2*d*. The end surfaces 2*a* and 2*b* also extend in the third direction D3 so as to connect the side surfaces 2*e* and 2*f*. The main surfaces 2*c* and 2*d* extend in the second direction D2 so as to connect the end surfaces 2*a* and 2*b*. The main surfaces 2*c* and 2*d* also extend in the third direction D3 so as to connect the side surfaces 2*e* and 2*f*. The side surfaces 2*e* and 2*f* extend in the first direction D1 so as to connect the main surfaces 2*c* and 2*d*. The side surfaces 2*e* and 2*f* also extend in the second direction D2 so as to connect the end surfaces 2*a* and 2*b*.

The main surface 2*d* (one main surface) is a mounting surface. The main surface 2*d* faces another electronic device (not illustrated) when, for example, the multilayer coil component 1 is mounted on the electronic device (such as a circuit base material and a multilayer electronic component). The end surfaces 2*a* and 2*b* are continuous from the mounting surface (that is, the main surface 2*d*).

The length of the element body 2 in the second direction D2 is longer than the length of the element body 2 in the first direction D1 and the length of the element body 2 in the third direction D3. The length of the element body 2 in the first direction D1 is longer than the length of the element body 2 in the third direction D3. In other words, in the present embodiment, the end surfaces 2*a* and 2*b*, the main surfaces 2*c* and 2*d*, and the side surfaces 2*e* and 2*f* have a rectangular shape. The length of the element body 2 in the second direction D2 may be equivalent to or shorter than the length of the element body 2 in the first direction D and the length of the element body 2 in the third direction D3.

It should be noted that "equivalent" in the present embodiment may mean not only "equal" but also a value including a slight difference, a manufacturing error, or the like in a preset range. For example, it is defined that a plurality of values are equivalent insofar as the plurality of values are included in the range of 95% to 105% of the average value of the plurality of values.

In the element body 2, a plurality of element body layers (insulator layers) 10*a* to 10*x* (see FIG. 5) are laminated in the first direction D1. In other words, the lamination direction of the element body 2 is the first direction D1. The configuration of the lamination will be described in detail later. In the actual element body 2, the plurality of element body layers 10*a* to 10*x* are integrated to the extent that the boundaries between the layers cannot be visually recognized. The element body layers 10*a* to 10*x* are made of, for example, a magnetic material (Ni—Cu—Zn-based ferrite material, Ni—Cu—Zn—Mg-based ferrite material, Ni—Cu-based ferrite material, or the like). The magnetic material constituting the element body layers 10*a* to 10*x* may contain a Fe alloy or the like. The element body layers 10*a* to 10*x* may be made of a non-magnetic material (glass ceramic material, dielectric material, or the like).

Each of the first terminal electrode 3 and the second terminal electrode 4 is provided in the element body 2. The first terminal electrode 3 is configured by a first terminal electrode layer 18*x* (see FIG. 5). The second terminal electrode 4 is configured by a second terminal electrode layer 19*x* (see FIG. 5). Each of the first terminal electrode 3 and the second terminal electrode 4 is disposed on the main surface 2*d* of the element body 2. The first terminal electrode 3 and the second terminal electrode 4 are provided in the element body 2 so as to be separated from each other in the second direction D2. Specifically, the first terminal electrode 3 is disposed on the end surface 2*a* side of the element body 2. The second terminal electrode 4 is disposed on the end surface 2*b* side of the element body 2.

Each of the first terminal electrode 3 and the second terminal electrode 4 has a rectangular shape. Each of the first terminal electrode 3 and the second terminal electrode 4 is disposed such that the longitudinal direction is along the third direction D3 and the lateral direction is along the second direction D2. In other words, each side of the first terminal electrode 3 and the second terminal electrode 4 is parallel to the end surfaces 2*a* and 2*b* or the side surfaces 2*e* and 2*f*. As illustrated in FIGS. 3 and 4, the first terminal electrode 3 and the second terminal electrode 4 protrude from the main surface 2*d*. In other words, in the present embodiment, the surfaces of the first terminal electrode 3 and the second terminal electrode 4 are not flush with the main surface 2*d*.

Each of the first terminal electrode 3 and the second terminal electrode 4 may be provided with a plating layer (not illustrated) containing, for example, Ni, Sn, Au, or the like by electrolytic plating or electroless plating. The plating layer may have, for example, a Ni plating film containing Ni and covering the first terminal electrode 3 and the second terminal electrode 4 and an Au plating film containing Au and covering the Ni plating film.

The coil 5 is disposed in the element body 2. The coil 5 is configured by a plurality of coil conductor layers 12*b* to 12*v* (see FIG. 5). The plurality of coil conductor layers 12*b* to 12*v* are interconnected to constitute the coil 5 in the element body 2. The coil axis of the coil 5 is provided along the first direction D1. The coil conductor layers 12*b* to 12*v* are disposed so as to overlap at least in part when viewed from the first direction D1. The coil 5 is substantially parallelogrammic when viewed from the first direction D1. The coil 5 does not include an acute angle (less than 90°) when viewed from the first direction D1. The plurality of coil conductor layers 12*b* to 12*v* are made of a conductive material (such as Ag and Pd). The coil conductor layers 12*b* to 12*v* are disposed apart from the end surfaces 2*a* and 2*b*, the main surfaces 2*c* and 2*d*, and the side surfaces 2*e* and 2*f*.

The first connecting conductor 6 is disposed in the element body 2. The first connecting conductor 6 connects the first terminal electrode 3 and the coil 5. The first connecting conductor 6 is a through hole conductor. The first connecting conductor 6 extends in the first direction D1 and is connected to the first terminal electrode 3 and one end of the coil 5. Specifically, the end portion of the first connecting conductor 6 on the main surface 2*c* (the other main surface) side in the first direction D1 is connected to one end of the coil 5 positioned on the main surface 2*c* side. The first connecting conductor 6 is configured by a plurality of first connecting conductor layers 14*b* to 14*w* (see FIG. 5). The first connecting conductor 6 is disposed outside the coil 5 when viewed from the first direction D1. Specifically, the first connecting conductor 6 is disposed in a corner portion when viewed from the first direction D1. More specifically, the first connecting conductor 6 is disposed in the corner portion formed by the end surface 2*a* and the side surface 2*e*. The first connecting conductor 6 has a triangular cross section (cross section along the second direction D2 and the third direction D3) orthogonal to the extension direction (first direction D1). In other words, the first connecting conductor 6 has a triangular column shape. The triangular shape includes, for example, a shape in which each corner is chamfered and a shape in which each corner is rounded.

Figure 6:
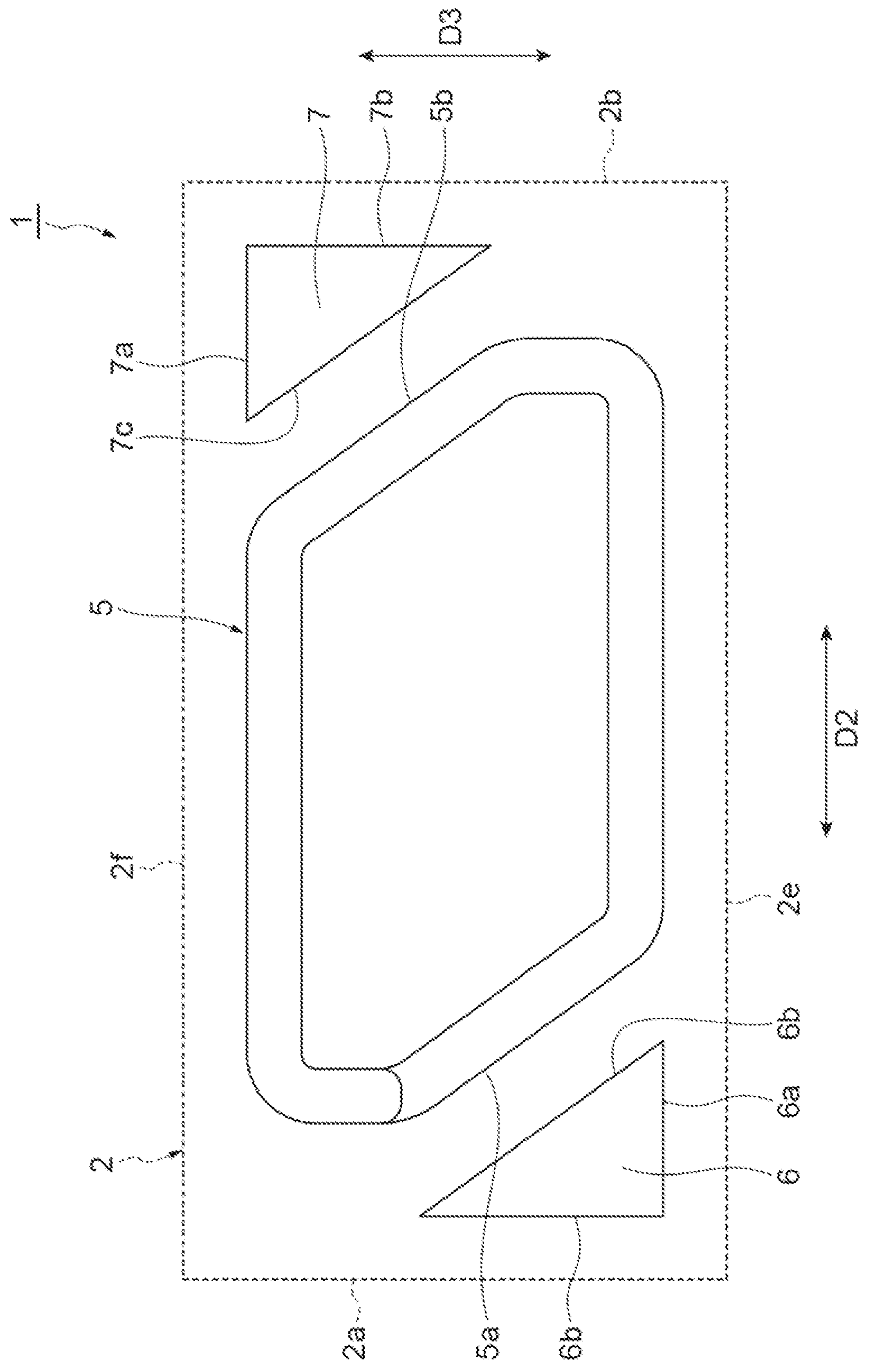
FIG. 6 is a plan view of the multilayer coil component illustrated in FIG. 1.

The first connecting conductor 6 has a hypotenuse intersecting with the second direction D2 and the third direction D3 in a cross section orthogonal to the first direction D1. In other words, the first connecting conductor 6 has a hypotenuse intersecting with the end surfaces 2*a* and 2*b* and the side surfaces 2*e* and 2*f* in a cross section orthogonal to the first direction D1. As illustrated in FIG. 6, in the present embodiment, the first connecting conductor 6 has a first side 6*a*, a second side 6*b*, and a third side 6*c* since the cross section is triangular. The third side 6*c* is a hypotenuse (first hypotenuse). In the present embodiment, the first side 6*a* is parallel to the longitudinal side of the first terminal electrode 3 (side along the second direction D2). The second side 6*b* is parallel to the lateral side of the first terminal electrode 3 (side along the third direction D3).

The second connecting conductor 7 is disposed in the element body 2. The second connecting conductor 7 connects the second terminal electrode 4 and the coil 5. The second connecting conductor 7 is a through hole conductor. The second connecting conductor 7 extends in the first direction D1 and is connected to the second terminal electrode 4 and the other end of the coil 5. Specifically, the end portion of the second connecting conductor 7 on the main surface 2*c* side in the first direction D1 is connected to the other end of the coil 5 positioned on the main surface 2*d* side. The second connecting conductor 7 is configured by a plurality of second connecting conductor layers 16*v* and 16*w* (see FIG. 5). The second connecting conductor 7 is disposed outside the coil 5 when viewed from the first direction D1. Specifically, the second connecting conductor 7 is disposed in a corner portion when viewed from the first direction D1. More specifically, the second connecting conductor 7 is disposed in the corner portion formed by the end surface 2*b* and the side surface 2*f*. In other words, the second connecting conductor 7 is disposed diagonally with the first connecting conductor 6. The second connecting conductor 7 has a triangular cross section (cross section along the second direction D2 and the third direction D3) orthogonal to the extension direction (first direction D1). In other words, the second connecting conductor 7 has a triangular column shape.

The second connecting conductor 7 has a hypotenuse intersecting with the second direction D2 and the third direction D3 in a cross section orthogonal to the first direction D1. In other words, the second connecting conductor 7 has a hypotenuse intersecting with the end surfaces 2*a* and 2*b* and the side surfaces 2*e* and 2*f* in a cross section orthogonal to the first direction DL. In the present embodiment, the second connecting conductor 7 has a first side 7*a*, a second side 7*b*, and a third side 7*c* since the cross section is triangular. The third side 7*c* is a hypotenuse (second hypotenuse). In the present embodiment, the first side 7*a* is parallel to the longitudinal side of the second terminal electrode 4. The second side 7*b* is parallel to the lateral side of the second terminal electrode 4.

Figure 5:
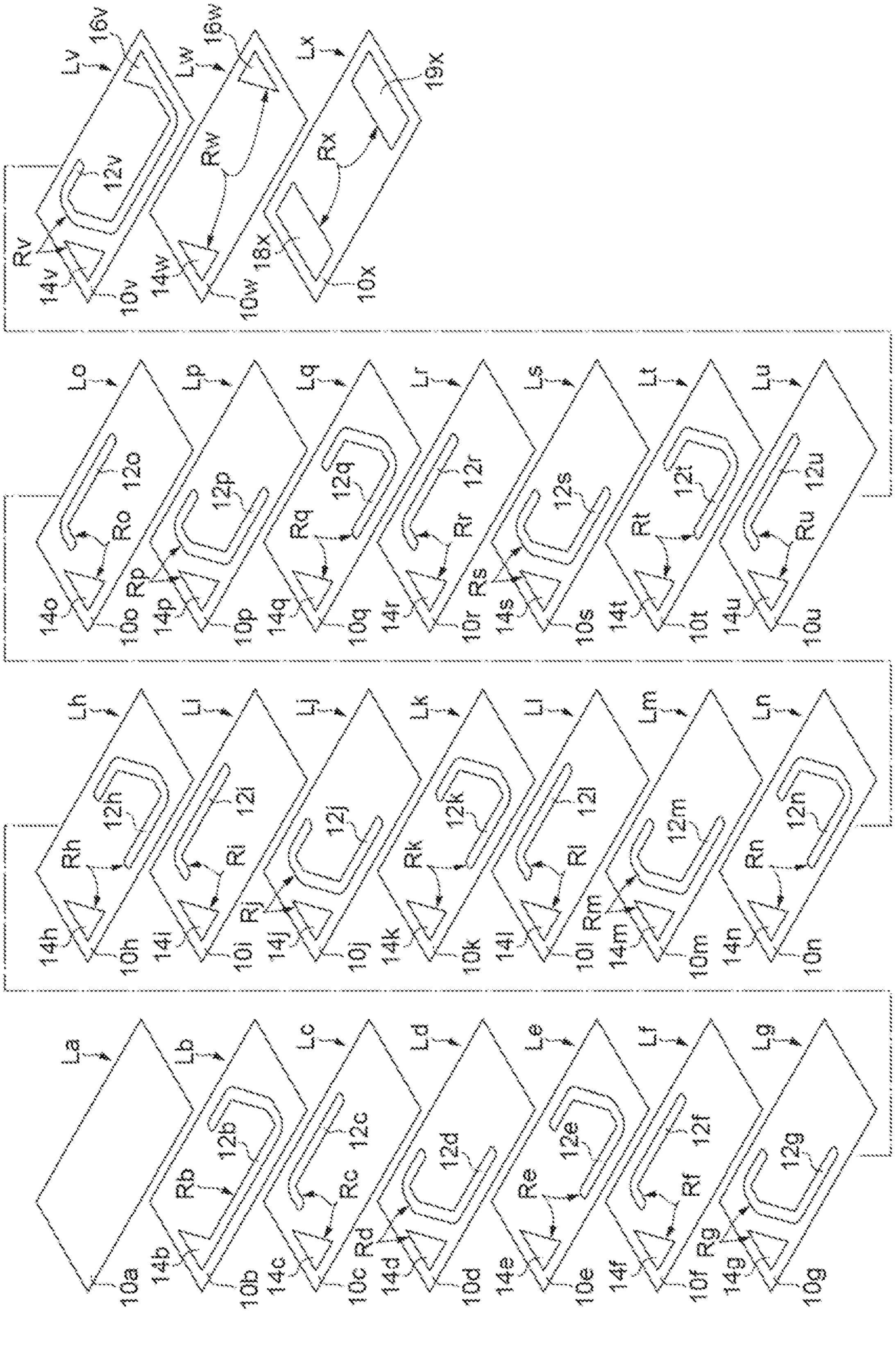
FIG. 5 is an exploded perspective view of the multilayer coil component illustrated in FIG. 1.

FIG. 5 is an exploded perspective view of the multilayer coil component. As illustrated in FIG. 5, the multilayer coil component 1 includes a plurality of layers La, Lb, Lc, Ld, Le, Lf, Lg, Lh, Li, Lj, Lk, Ll, Lm, Ln, Lo, Lp, Lq, Lr, Ls, Lt, Lu, Lv, Lw, and Lx. The multilayer coil component 1 is configured by, for example, laminating the layers La to Lx in order from the main surface 2*c* side. The layer Lc, the layer Lf, the layer Li, the layer Ll, the layer Lo, the layer Lr, and the layer Lu have similar configurations. The layer Ld, the layer Lg, the layer Lj, the layer Lm, the layer Lp, and the layer Ls have similar configurations. The layer Le, the layer Lh, the layer Lk, the layer Ln, the layer Lq, and the layer Lt have similar configurations.

The layer La is configured by the element body layer 10*a*.

The layer Lb is configured by mutually combining the element body layer 10*b*, the coil conductor layer 12*b*, and the first connecting conductor layer 14*b*. The coil conductor layer 12*b* and the first connecting conductor layer 14*b* are integrally formed. The element body layer 10*b* is provided with a defective portion Rb into which the coil conductor layer 12*b* and the first connecting conductor layer 14*b* are fitted. The defective portion Rb has a shape corresponding to the coil conductor layer 12*b* and the first connecting conductor layer 14*b*. The element body layer 10*b* and the entire coil conductor layer 12*b* and first connecting conductor layer 14*b* have a mutually complementary relationship.

The layer Le is configured by mutually combining the element body layer 10*c*, the coil conductor layer 12*c*, and the first connecting conductor layer 14*c*. The element body layer 10*c* is provided with a defective portion Rc into which the coil conductor layer 12*c* and the first connecting conductor layer 14*c* are fitted. The defective portion Re has a shape corresponding to the coil conductor layer 12*c* and the first connecting conductor layer 14*c*. The element body layer 10*c* and the entire coil conductor layer 12*c* and first connecting conductor layer 14*c* have a mutually complementary relationship.

The layer Ld is configured by mutually combining the element body layer 10*d*, the coil conductor layer 12*d*, and the first connecting conductor layer 14*d*. The element body layer 10*d* is provided with a defective portion Rd into which the coil conductor layer 12*d* and the first connecting conductor layer 14*d* are fitted. The defective portion Rd has a shape corresponding to the coil conductor layer 12*d* and the first connecting conductor layer 14*d*. The element body layer 10*d* and the entire coil conductor layer 12*d* and first connecting conductor layer 14*d* have a mutually complementary relationship.

The layer Le is configured by mutually combining the element body layer 10*e*, the coil conductor layer 12*e*, and the first connecting conductor layer 14*e*. The element body layer 10*e* is provided with a defective portion Re into which the coil conductor layer 12*e* and the first connecting conductor layer 4*e* are fitted. The defective portion Re has a shape corresponding to the coil conductor layer 12*e* and the first connecting conductor layer 14*e*. The element body layer 10*e* and the entire coil conductor layer 12*c* and first connecting conductor layer 14*e* have a mutually complementary relationship.

The layer Lf is configured by mutually combining the element body layer 10*f*, the coil conductor layer 12*f*, and the first connecting conductor layer 14*f*. The element body layer 10*f* is provided with a defective portion Rf. The layer Lg is formed by mutually combining the element body layer 10*g*, the coil conductor layer 12*g*, and the first connecting conductor layer 14*g*. The element body layer 10*g* is provided with a defective portion Rg. The layer Lh is formed by mutually combining the element body layer 10*h*, the coil conductor layer 12*h*, and the first connecting conductor layer 14*h*. The element body layer 10*h* is provided with a defective portion Rh.

The layer Li is configured by mutually combining the element body layer 10*i*, the coil conductor layer 12*i*, and the first connecting conductor layer 14*i*. The element body layer 10*i* is provided with a defective portion Ri. The layer Lj is configured by mutually combining the element body layer 10*j*, the coil conductor layer 12*j*, and the first connecting conductor layer 14*j*. The element body layer 10*j* is provided with a defective portion Rj. The layer Lk is configured by mutually combining the element body layer 10*k*, the coil conductor layer 12*k*, and the first connecting conductor layer 14*k*. The element body layer 10*k* is provided with a defective portion Rk.

The layer L1 is configured by mutually combining the element body layer 10*l*, the coil conductor layer 12*l*, and the first connecting conductor layer 14*l*. The element body layer 10*l* is provided with a defective portion Rl. The layer Lm is configured by mutually combining the element body layer 10*m*, the coil conductor layer 12*m*, and the first connecting conductor layer 14*m*. The element body layer 10*m* is provided with a defective portion Rm. The layer Ln is configured by mutually combining the element body layer 10*n*, the coil conductor layer 12*n*, and the first connecting conductor layer 14*n*. The element body layer 10*n* is provided with a defective portion Rn.

The layer Lo is configured by mutually combining the element body layer 10*o*, the coil conductor layer 12*o*, and the first connecting conductor layer 14*o*. The element body layer 10*o* is provided with a defective portion Ro. The layer Lp is configured by mutually combining the element body layer 10*p*, the coil conductor layer 12*p*, and the first connecting conductor layer 14*p*. The element body layer 10*p* is provided with a defective portion Rp. The layer Lq is configured by mutually combining the element body layer 10*q*, the coil conductor layer 12*q*, and the first connecting conductor layer 14*q*. The element body layer 10*q* is provided with a defective portion Rq.

The layer Lr is configured by mutually combining the element body layer 10*r*, the coil conductor layer 12*r*, and the first connecting conductor layer 14*r*. The element body layer 10*r* is provided with a defective portion Rr. The layer Ls is configured by mutually combining the element body layer 10*s*, the coil conductor layer 12*s*, and the first connecting conductor layer 14*s*. The element body layer 10*s* is provided with a defective portion Rs. The layer Lt is configured by mutually combining the element body layer 10*t*, the coil conductor layer 12*t*, and the first connecting conductor layer 14*t*. The element body layer 10*t* is provided with a defective portion Rt. The layer Lu is configured by mutually combining the element body layer 10*u*, the coil conductor layer 12*u*, and the first connecting conductor layer 14*u*. The element body layer 10*u* is provided with a defective portion Ru.

The layer Lv is configured by mutually combining the element body layer 10*v*, the coil conductor layer 12*v*, the first connecting conductor layer 14*v*, and the second connecting conductor layer 16*v*. The coil conductor layer 12*v* and the second connecting conductor layer 16*v* are integrally formed. The element body layer 10*v* is provided with a defective portion Rv into which the coil conductor layer 12*v*, the first connecting conductor layer 14*v*, and the second connecting conductor layer 16*v* are fitted. The defective portion Rv has a shape corresponding to the coil conductor layer 12*v*, the first connecting conductor layer 14*v*, and the second connecting conductor layer 16*v*. The element body layer 10v and the entire coil conductor layer 12v, first connecting conductor layer 14v, and second connecting conductor layer 16v have a mutually complementary relationship. Although not illustrated, a plurality of the layers Lv are laminated in the present embodiment.

The layer Lw is configured by mutually combining the element body layer 10w, the first connecting conductor layer 14w, and the second connecting conductor layer 16w. The element body layer 10w is provided with a defective portion Rw into which the first connecting conductor layer 14w and the second connecting conductor layer 16w are fitted. The defective portion Rw has a shape corresponding to the first connecting conductor layer 14w and the second connecting conductor layer 16w. The element body layer 10w and the entire first connecting conductor layer 14w and second connecting conductor layer 16w have a mutually complementary relationship.

The layer Lx is configured by mutually combining the element body layer 10x, the first terminal electrode layer 18x, and the second terminal electrode layer 19x. The element body layer 10x is provided with a defective portion Rx into which the first terminal electrode layer 18x and the second terminal electrode layer 19x are fitted. The defective portion Rx has a shape corresponding to the first terminal electrode layer 18x and the second terminal electrode layer 19x. The element body layer 10x and the entire first terminal electrode layer 18x and second terminal electrode layer 19x have a mutually complementary relationship.

The widths of the defective portions Rb to Rx (hereinafter, referred to as the width of the defective portion) are basically set to be wider than the widths of the coil conductor layers 12b to 12v, the first connecting conductor layers 14b to 14w, the second connecting conductor layers 16v and 16w, the first terminal electrode layer 18x, and the second terminal electrode layer 19x (hereinafter, referred to as the width of the conductor portion). The width of the defective portion may be intentionally set to be narrower than the width of the conductor portion for adhesiveness improvement between the element body layers 10b to 10x and the coil conductor layers 12b to 12v, the first connecting conductor layers 14b to 14w, the second connecting conductor layers 16v and 16w, the first terminal electrode layer 18x, and the second terminal electrode layer 19x. The value obtained by subtracting the width of the conductor portion from the width of the defective portion is, for example, preferably −3 μm or more and 10 μm or less and more preferably 0 μm or more and 10 μm or less.

FIG. 6 is a plan view of the multilayer coil component illustrated in FIG. 1. FIG. 6 illustrates a state where the main surface 2c of the multilayer coil component 1 is viewed from the first direction D1. In FIG. 6, the element body 2 is indicated by a dashed line for convenience of description with the coil conductor layer 12b and the coil conductor layer 12v of the coil 5 not illustrated.

As illustrated in FIG. 6, in the multilayer coil component 1, the coil 5 is disposed so as to face the third side 6c of the first connecting conductor 6 when viewed from the first direction D1. In the coil 5 that is viewed from the first direction D1, a side 5a facing the third side 6c is parallel to the third side 6c at the part that faces the third side 6c of the first connecting conductor 6. In the present embodiment, a part of each of the coil conductor layer 12d, the coil conductor layer 12g, the coil conductor layer 12j, the coil conductor layer 12m, the coil conductor layer 12p, the coil conductor layer 12s, and the coil conductor layer 12v constituting the coil 5 faces the third side 6c of the first connecting conductor 6. In each of the coil conductor layer 12d, the coil conductor layer 12g, the coil conductor layer 12j, the coil conductor layer 12m, the coil conductor layer 12p, the coil conductor layer 12s, and the coil conductor layer 12v, the side that faces the third side 6c of the first connecting conductor 6 is parallel to the third side 6c. Being parallel also includes the concept of being substantially parallel and may include a case where the angle formed by two sides is, for example, within 15° as well as a case where both are strictly parallel.

In the multilayer coil component 1, the coil 5 is disposed so as to face the third side 7c of the second connecting conductor 7 when viewed from the first direction D1. In the coil 5 in the multilayer coil component 1 that is viewed from the first direction D1, a side 5b facing the third side 7c is parallel to the third side 7c at the part that faces the third side 7c of the second connecting conductor 7. In the present embodiment, a part of each of the coil conductor layer 12b, the coil conductor layer 12e, the coil conductor layer 12h, the coil conductor layer 12k, the coil conductor layer 12n, the coil conductor layer 12q, and the coil conductor layer 12t constituting the coil 5 faces the third side 7c of the second connecting conductor 7. In each of the coil conductor layer 12b, the coil conductor layer 12e, the coil conductor layer 12h, the coil conductor layer 12k, the coil conductor layer 12n, the coil conductor layer 12q, and the coil conductor layer 12t, the side that faces the third side 7c of the second connecting conductor 7 is parallel to the third side 7c. In the second connecting conductor 7 that is viewed from the first direction D1, the third side 7c of the second connecting conductor 7 and a part of each of the coil conductor layer 12b, the coil conductor layer 12e, the coil conductor layer 12h, the coil conductor layer 12k, the coil conductor layer 12n, the coil conductor layer 12q, and the coil conductor layer 12t planarly face each other.

An example of a method for manufacturing the multilayer coil component 1 according to the embodiment will be described.

First, an element body forming layer is formed by applying element body paste containing the material constituting the element body layers 10a to 10x described above and a photosensitive material onto a base material (such as a PET film). The photosensitive material contained in the element body paste may be either a negative-type photosensitive material or a positive-type photosensitive material, and known photosensitive materials can be used. Subsequently, the element body forming layer is exposed and developed by, for example, a photolithography method using a Cr mask. Then, an element body pattern from which a shape corresponding to the shape of the conductor forming layer to be described later is removed is formed on the base material. The element body pattern is a layer that becomes the element body layers 10a to 10x after heat treatment. In other words, an element body pattern provided with a defective portion that becomes the defective portions Rb to Rx is formed. It should be noted that "photolithography method" of the present embodiment may be any by which a layer that contains a photosensitive material and is to be processed is processed into a desired pattern by exposure and development and is not limited to the type of the mask and so on.

Meanwhile, the conductor forming layer is formed by applying conductor paste containing the materials constituting the coil conductor layers 12b to 12v, the first connecting conductor layers 14b to 14w, the second connecting conductor layers 16v and 16w, the first terminal electrode layer 18x, and the second terminal electrode layer 19x described above and a photosensitive material onto a base material (such as a PET film). The photosensitive material contained in the conductor paste may be either a negative-type photosensitive material or a positive-type photosensitive material, and known photosensitive materials can be used. Subsequently, the conductor forming layer is exposed and developed by, for example, a photolithography method using a Cr mask and a conductor pattern is formed on the base material. The conductor pattern is a layer that becomes the coil conductor layers 12*b* to 12*v*, the first connecting conductor layers 14*b* to 14*v*, the second connecting conductor layers 16*v* and 16*w*, the first terminal electrode layer 18*x*, and the second terminal electrode layer 19*x* after heat treatment.

Subsequently, the element body forming layer is transferred from the base material onto a support body. The element body forming layer becomes the layer La after heat treatment.

Subsequently, the conductor pattern and the element body pattern are repeatedly transferred onto the support body. As a result, the conductor pattern and the element body pattern are laminated in the third direction D3. Specifically, first, the conductor pattern is transferred from the base material onto the element body forming layer. Next, the element body pattern is transferred from the base material onto the element body forming layer. The conductor pattern is combined with the defective portion of the element body pattern, and the element body pattern and the conductor pattern become the same layer on the element body forming layer. Further, the conductor pattern and element body pattern transfer process is repeatedly performed and the conductor pattern and the element body pattern are laminated in a state of being combined with each other. As a result, the layers that become the layers Lb to Lx after heat treatment are laminated.

Subsequently, the element body forming layer is transferred from the base material onto the layer laminated in the conductor pattern and element body pattern transfer process. The element body forming layer becomes the layer La after heat treatment.

In this manner, the laminate that constitutes the multilayer coil component 1 after heat treatment is formed on the support body. Subsequently, the obtained laminate is cut into a predetermined size. Then, heat treatment is performed after binder removal treatment is performed on the cut laminate. The heat treatment temperature is, for example, approximately 850 to 900° C. If necessary, a plating layer may be provided by performing electrolytic plating or electroless plating on the first terminal electrode 3 and the second terminal electrode 4 after the heat treatment.

As described above, in the multilayer coil component 1 according to the present embodiment, the first connecting conductor 6 connects one end of the coil 5 positioned on the main surface 2*d* side and the first terminal electrode 3 and extends along the first direction D1. In this configuration, the area (region) where the first connecting conductor 6 and the coil 5 face each other becomes large, and thus the effect of stray capacitance on characteristics may increase. In the multilayer coil component 1, the coil 5 faces the third side 6*c* of the first connecting conductor 6 when viewed from the first direction D1. At the part that faces the third side 6*c* of the first connecting conductor 6, the side 5*a* facing the third side 6*c* is parallel to the third side 6*c*. Accordingly, in the multilayer coil component 1, a certain distance can be ensured between the first connecting conductor 6 and the coil 5, and thus stray capacitance formation between the coil 5 and the first connecting conductor 6 can be suppressed. In addition, in this configuration, the diameter of the coil 5 can be increased. Further, in the multilayer coil component 1, no corner portion is formed at the part where the coil 5 faces the first connecting conductor 6. Accordingly, in the multilayer coil component 1, a decline in direct current superimposition characteristics attributable to magnetic flux concentration in the corner portion can be suppressed. Accordingly, in the multilayer coil component 1, the generation of stray capacitance can be suppressed and the characteristics can be improved.

In the multilayer coil component 1 according to the present embodiment, the coil 5 faces the third side 7*c* of the second connecting conductor 7 when viewed from the first direction D1. At the part that faces the third side 7*c* of the second connecting conductor 7, the side 5*b* facing the third side 7*c* is parallel to the third side 7*c*. In this configuration, a certain distance can be ensured between the second connecting conductor 7 and the coil 5, and thus stray capacitance formation between the coil 5 and the second connecting conductor 7 can be suppressed.

In the multilayer coil component 1 of the present embodiment, each of the first terminal electrode 3 and the second terminal electrode 4 has a rectangular shape when viewed from the third direction D3. Each of the first terminal electrode 3 and the second terminal electrode 4 is disposed such that each side is parallel to the end surfaces 2*a* and 2*b* or the side surfaces 2*e* and 2*f*. In the multilayer coil component 1, the first side 6*a* and the second side 6*b* of the first connecting conductor 6 other than the third side 6*c* are parallel to each side of the first terminal electrode 3. In this configuration, the inner diameter of the coil 5 can be increased.

Second Embodiment

Figure 7:
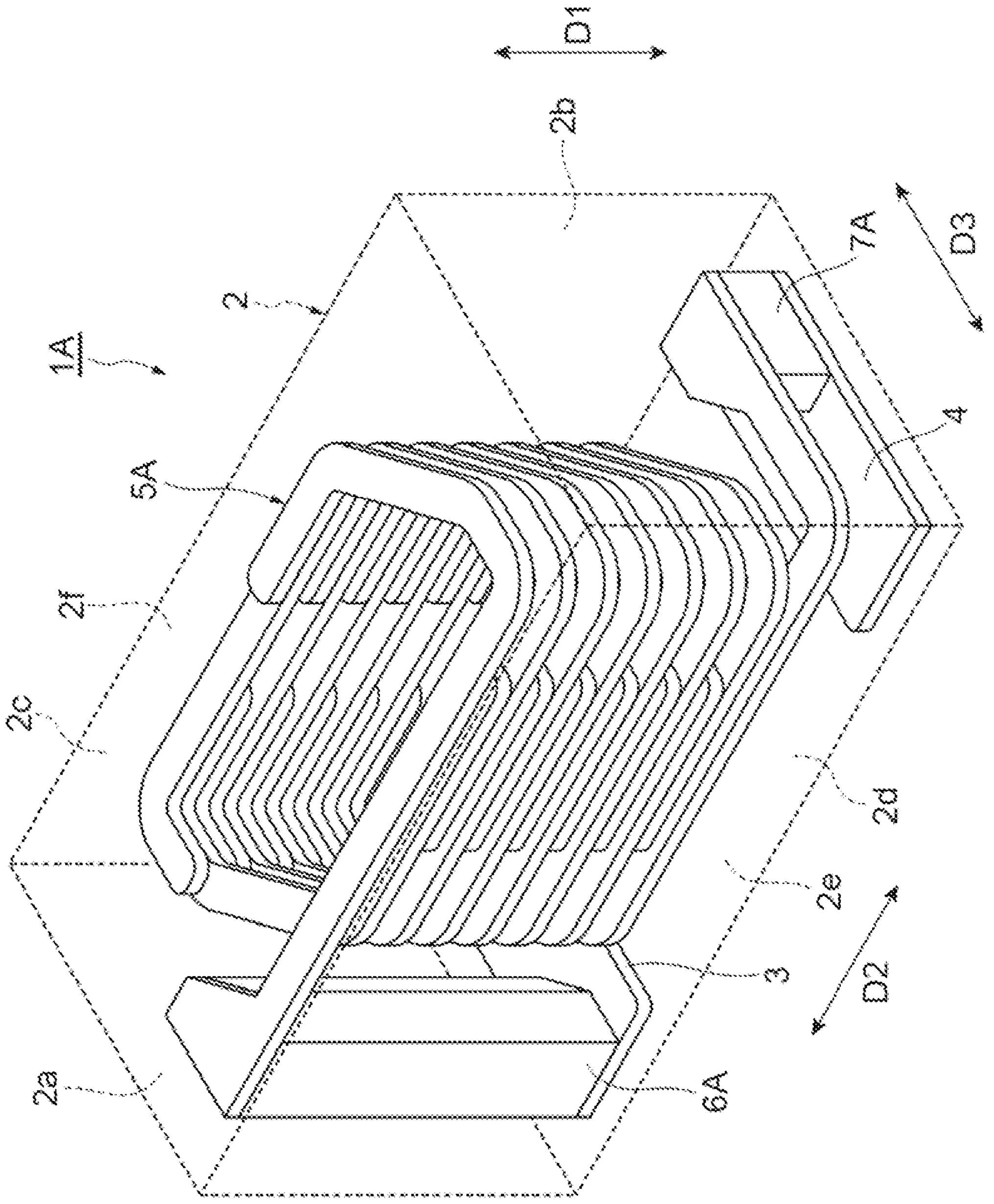
FIG. 7 is a perspective view of a multilayer coil component according to a second embodiment.
Figure 8:
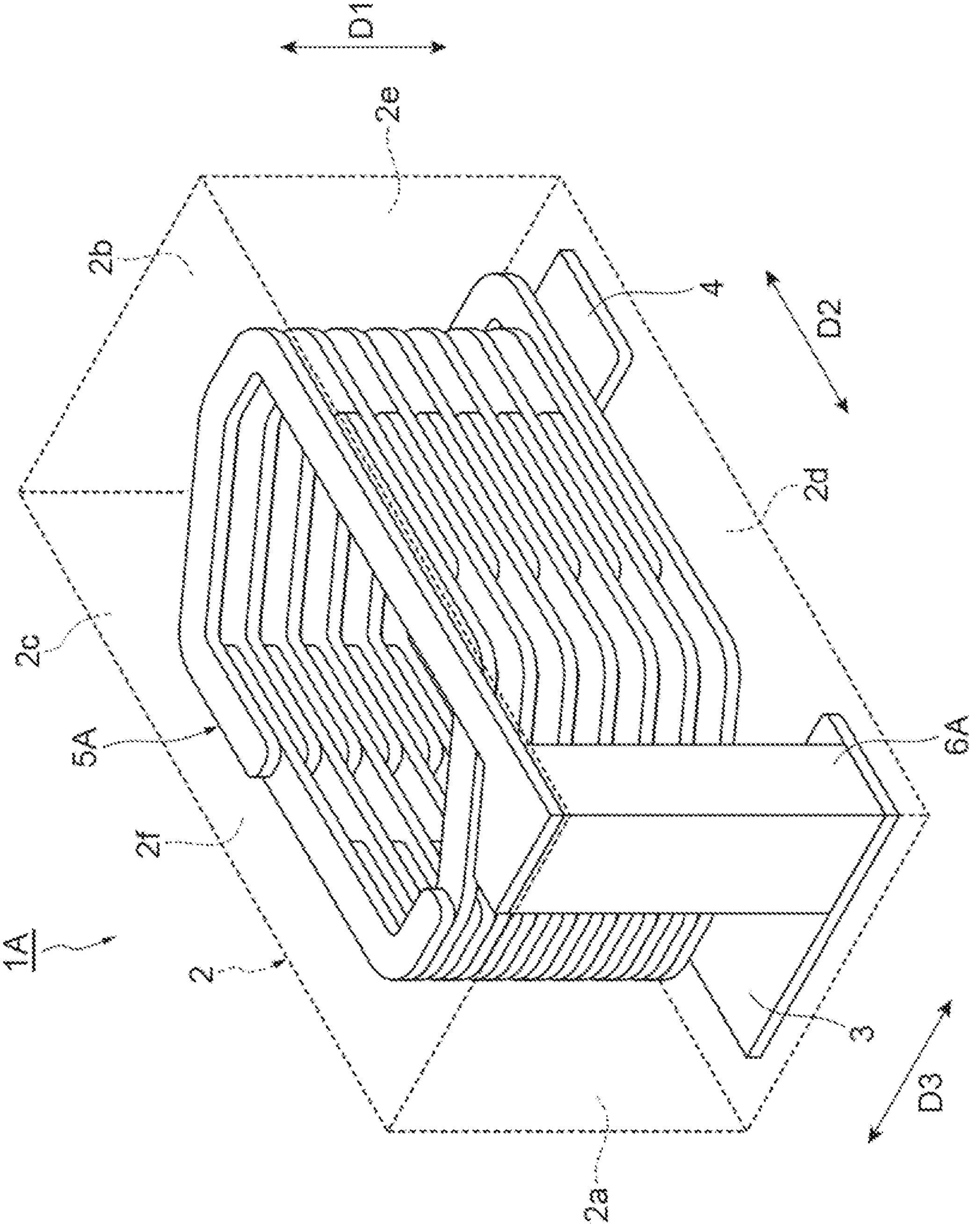
FIG. 8 is a perspective view of the multilayer coil component illustrated in FIG. 7.
Figure 9:
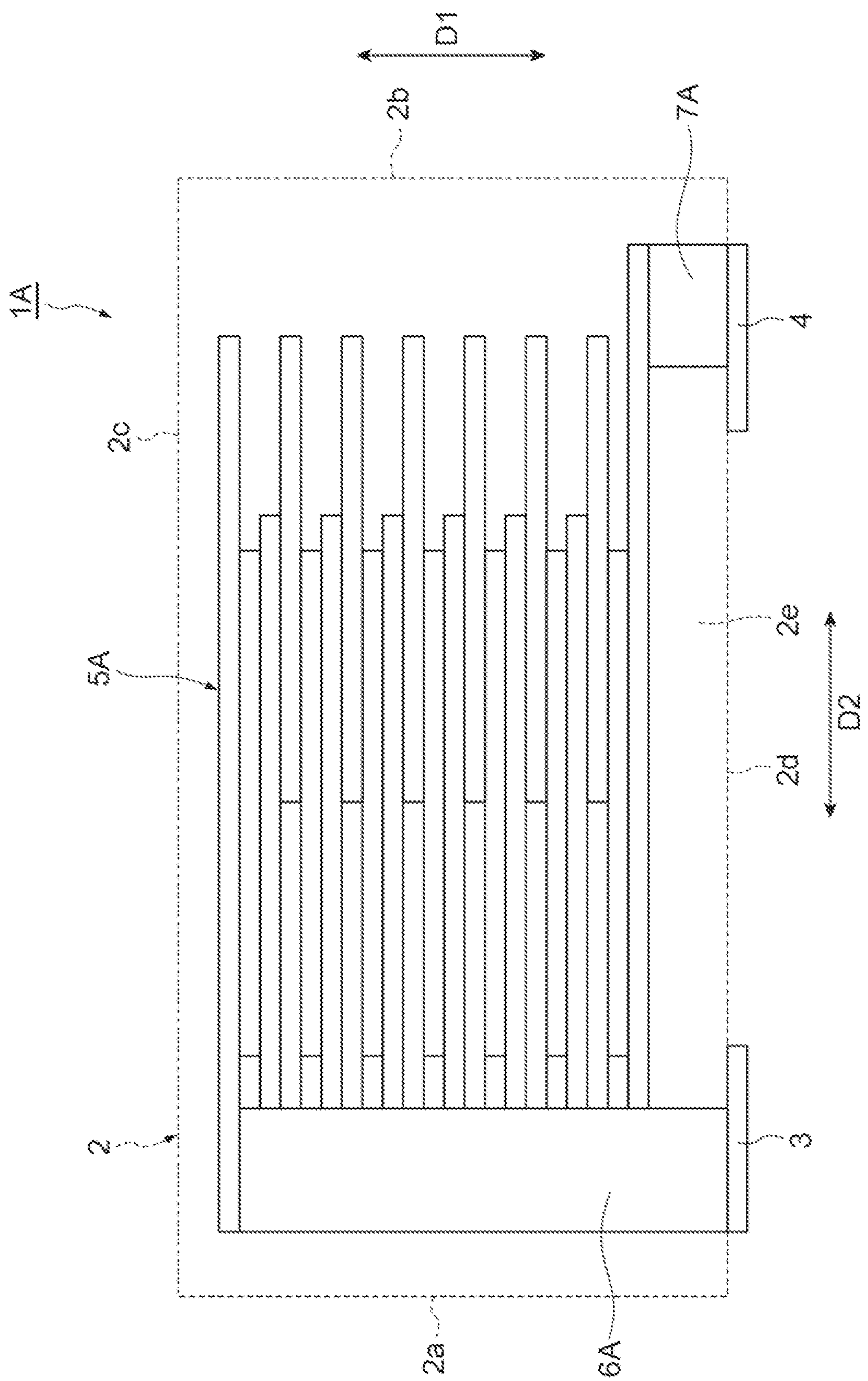
FIG. 9 is a side view of the multilayer coil component illustrated in FIG. 7.
Figure 10:
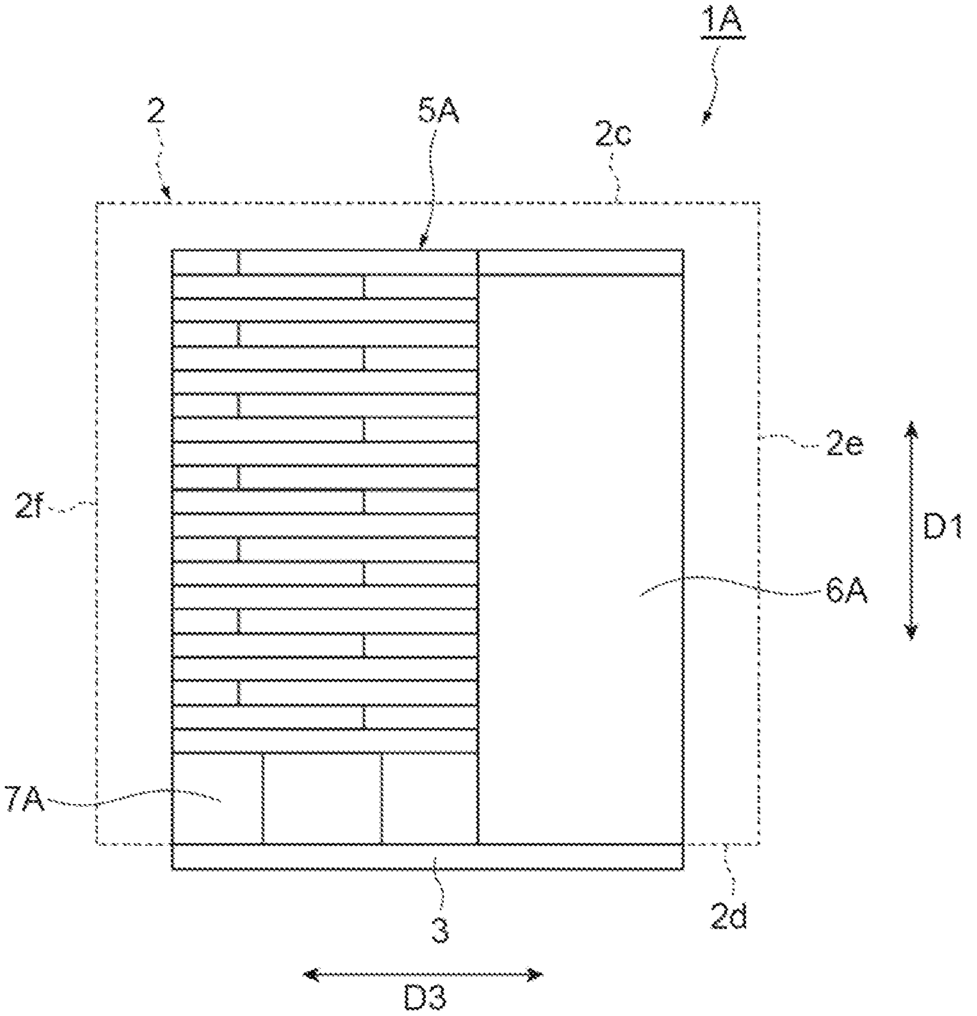
FIG. 10 is an end view of the multilayer coil component illustrated in FIG. 7.

A multilayer coil component according to a second embodiment will be described below with reference to FIGS. 7 to 10. FIG. 7 is a perspective view of the multilayer coil component according to the second embodiment. FIG. 8 is a perspective view of the multilayer coil component illustrated in FIG. 7. FIG. 9 is a side view of the multilayer coil component illustrated in FIG. 7. FIG. 10 is an end view of the multilayer coil illustrated in FIG. 7. As illustrated in FIGS. 7 to 10, a multilayer coil component 1A according to the second embodiment includes the element body 2, the first terminal electrode 3, the second terminal electrode 4, a coil 5A, a first connecting conductor 6A, and a second connecting conductor 7A. In FIGS. 7 to 10, the element body 2 is indicated by a dashed line for convenience of description.

In the element body 2, a plurality of element body layers (insulator layers) 20*a* to 20*x* (see FIG. 11) are laminated in the first direction D1.

The coil 5A is disposed in the element body 2. The coil 5A is configured by a plurality of coil conductor layers 22*b* to 22*v* (see FIG. 11). The plurality of coil conductor layers 22*b* to 22*v* are interconnected to constitute the coil 5A in the element body 2. The coil axis of the coil 5A is provided along the first direction D1. The coil conductor layers 22*b* to 22*v* are disposed so as to overlap at least in part when viewed from the first direction D1. The coil 5A is substantially parallelogrammic when viewed from the first direction D1. The coil 5A does not include an acute angle (less than 90°) when viewed from the first direction D1. The plurality of coil conductor layers 22*b* to 22*v* are made of a conductive material (such as Ag and Pd). The coil conductor layers 22*b* to 22*v* are disposed apart from the end surfaces 2*a* and 2*b*, the main surfaces 2*c* and 2*d*, and the side surfaces 2*e* and 2*f*.

The first connecting conductor 6A is disposed in the element body 2. The first connecting conductor 6A connects the first terminal electrode 3 and the coil 5A. The first connecting conductor 6A extends in the first direction D1 and is connected to the first terminal electrode 3 and one end of the coil 5A. Specifically, the end portion of the first connecting conductor 6A on the main surface 2*c* side in the first direction D1 is connected to one end of the coil 5A positioned on the main surface 2*c* side. The first connecting conductor 6A is configured by a plurality of first connecting conductor layers 24*b* to 24*v* (see FIG. 11). The first connecting conductor 6A is disposed outside the coil 5A when viewed from the first direction D1. Specifically, the first connecting conductor 6A is disposed in a corner portion when viewed from the first direction D1. More specifically, the first connecting conductor 6A is disposed in the corner portion formed by the end surface 2*a* and the side surface 2*e*. The first connecting conductor 6A has a polygonal (pentagonal) cross section (cross section along the second direction D2 and the third direction D3) orthogonal to the extension direction (first direction D1). In other words, the first connecting conductor 6A has a polygonal column shape. The polygonal shape includes, for example, a shape in which each corner is chamfered and a shape in which each corner is rounded.

Figure 12:
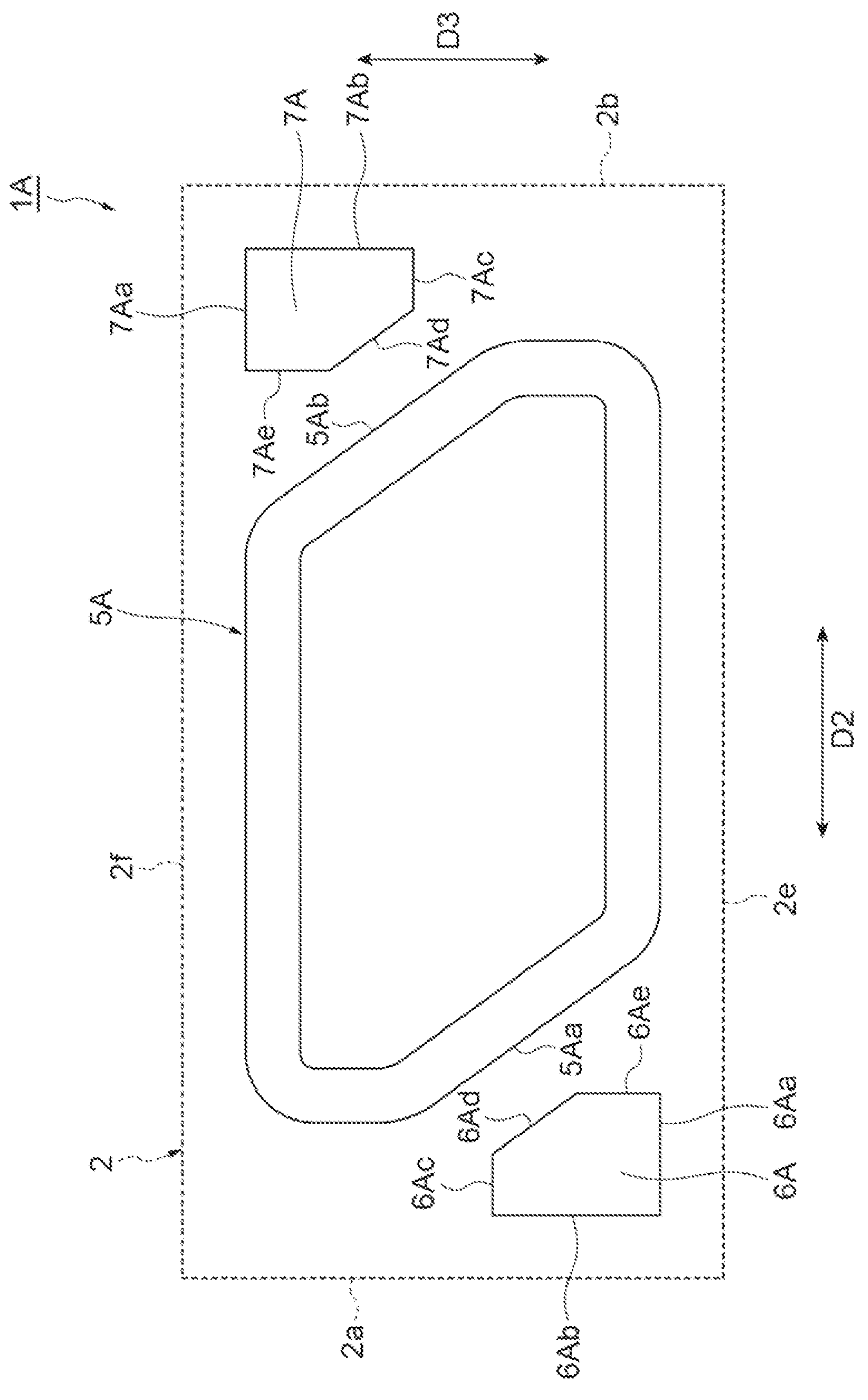
FIG. 12 is a plan view of the multilayer coil component illustrated in FIG. 7.

The first connecting conductor 6A has a hypotenuse intersecting with the second direction D2 and the third direction D3 in a cross section orthogonal to the first direction D1. In other words, the first connecting conductor 6A has a hypotenuse intersecting with the end surfaces 2*a* and 2*b* and the side surfaces 2*e* and 2*f* in a cross section orthogonal to the first direction D1. As illustrated in FIG. 12, in the present embodiment, the first connecting conductor 6A has a first side 6Aa, a second side 6Ab, a third side 6Ac, a fourth side 6Ad, and a fifth side 6Ae since the cross section is pentagonal. The fourth side 6Ad is a hypotenuse (first hypotenuse). In the present embodiment, the first side 6Aa is parallel to the longitudinal side of the first terminal electrode 3 (side along the third direction D3). The second side 6Ab is parallel to the lateral side of the first terminal electrode 3 (side along the second direction D2).

The second connecting conductor 7A is disposed in the element body 2. The second connecting conductor 7A connects the second terminal electrode 4 and the coil 5A. The second connecting conductor 7A extends in the first direction D1 and is connected to the second terminal electrode 4 and the other end of the coil 5A. Specifically, the end portion of the second connecting conductor 7A on the main surface 2*c* side in the first direction D1 is connected to the other end of the coil 5A positioned on the main surface 2*d* side. The second connecting conductor 7A is configured by a plurality of second connecting conductor layers 26*v* (see FIG. 11). The second connecting conductor 7A is disposed outside the coil 5A when viewed from the first direction D1. Specifically, the second connecting conductor 7A is disposed in a corner portion when viewed from the first direction D1. More specifically, the second connecting conductor 7A is disposed in the corner portion formed by the end surface 2*b* and the side surface 2*f*. In other words, the second connecting conductor 7A is disposed diagonally with the first connecting conductor 6A. The second connecting conductor 7A has a polygonal (pentagonal) cross section (cross section along the second direction D2 and the third direction D3) orthogonal to the extension direction (first direction D1). In other words, the second connecting conductor 7A has a polygonal column shape.

The second connecting conductor 7A has a hypotenuse intersecting with the second direction D2 and the third direction D3 in a cross section orthogonal to the first direction D1. In other words, the second connecting conductor 7A has a hypotenuse intersecting with the end surfaces 2*a* and 2*b* and the side surfaces 2*e* and 2*f* in a cross section orthogonal to the first direction D1. In the present embodiment, the second connecting conductor 7A has a first side 7Aa, a second side 7Ab, a third side 7Ac, a fourth side 7Ad, and a fifth side 7Ae since the cross section is pentagonal. The fourth side 7Ad is a hypotenuse (second hypotenuse). In the present embodiment, the first side 7Aa is parallel to the longitudinal side of the first terminal electrode 3. The second side 7Ab is parallel to the lateral side of the first terminal electrode 3.

Figure 11:
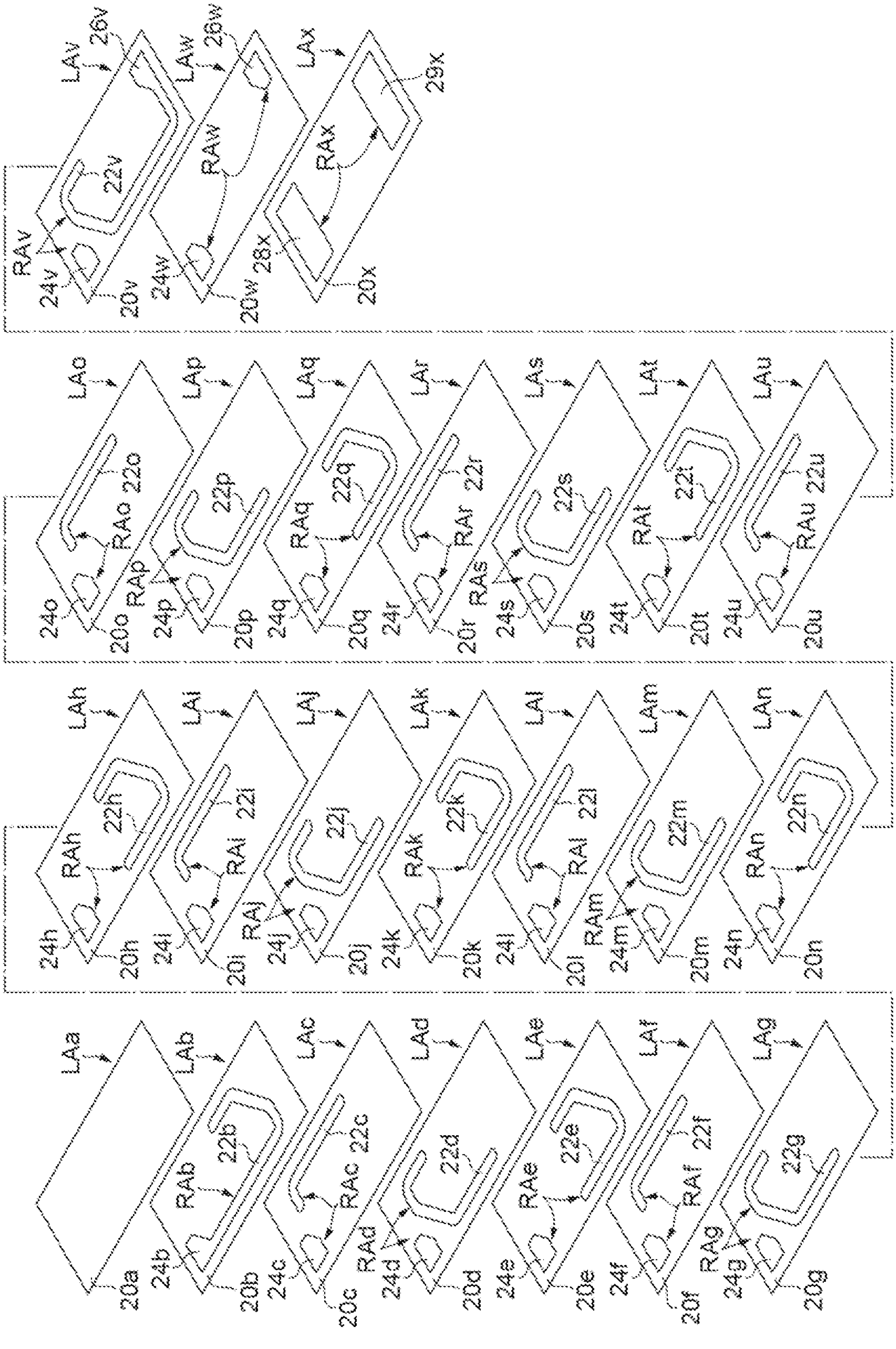
FIG. 11 is an exploded perspective view of the multilayer coil component illustrated in FIG. 7.

FIG. 11 is an exploded perspective view of the multilayer coil component. As illustrated in FIG. 11, the multilayer coil component 1A includes a plurality of layers LAa, LAb, LAc, LAd, LAe, LAf, LAg, LAh, LAi, LAj, LAk, LAl, LAm, LAn, LAo, LAp, LAq, LAr, LAs, LAt, LAu, LAv, LAw, and LAx. The multilayer coil component 1A is configured by, for example, laminating the layers LAa to LAx in order from the main surface 2*c* side. The layer LAc, the layer LAf, the layer LAi, the layer LAl, the layer LAo, the layer LAr, and the layer LAu have similar configurations. The layer LAd, the layer LAg, the layer LAj, the layer LAm, the layer LAp, and the layer LAs have similar configurations. The layer LAe, the layer LAh, the layer LAk, the layer LAn, the layer LAq, and the layer LAt have similar configurations.

The layer LAa is configured by the element body layer 20*a*.

The layer LAb is configured by mutually combining the element body layer 20*b*, the coil conductor layer 22*b*, and the first connecting conductor layer 24*b*. The coil conductor layer 22*b* and the first connecting conductor layer 24*b* are integrally formed. The element body layer 20*b* is provided with a defective portion RAb into which the coil conductor layer 22*b* and the first connecting conductor layer 24*b* are fitted. The defective portion RAb has a shape corresponding to the coil conductor layer 22*b* and the first connecting conductor layer 24*b*. The element body layer 20*b* and the entire coil conductor layer 22*b* and first connecting conductor layer 24*b* have a mutually complementary relationship.

The layer LAc is configured by mutually combining the element body layer 20*c*, the coil conductor layer 22*c*, and the first connecting conductor layer 24*c*. The element body layer 20*c* is provided with a defective portion RAc into which the coil conductor layer 22*c* and the first connecting conductor layer 24*c* are fitted. The defective portion RAc has a shape corresponding to the coil conductor layer 22*c* and the first connecting conductor layer 24*c*. The element body layer 20*c* and the entire coil conductor layer 22*c* and first connecting conductor layer 24*c* have a mutually complementary relationship.

The layer LAd is configured by mutually combining the element body layer 20*d*, the coil conductor layer 22*d*, and the first connecting conductor layer 24*d*. The element body layer 20*d* is provided with a defective portion RAd into which the coil conductor layer 22*d* and the first connecting conductor layer 24*d* are fitted. The defective portion RAd has a shape corresponding to the coil conductor layer 22*d* and the first connecting conductor layer 24*d*. The element body layer 20*d* and the entire coil conductor layer 22*d* and first connecting conductor layer 24*d* have a mutually complementary relationship.

The layer LAe is configured by mutually combining the element body layer 20*e*, the coil conductor layer 22*e*, and the first connecting conductor layer 24*e*. The element body layer 20*e* is provided with a defective portion RAe into which the coil conductor layer 22*e* and the first connecting conductor layer 24*e* are fitted. The defective portion RAe has a shape corresponding to the coil conductor layer 22*e* and the first connecting conductor layer 24*e*. The element body layer 20*e* and the entire coil conductor layer 22*e* and first connecting conductor layer 24*e* have a mutually complementary relationship.

The layer LAf is configured by mutually combining the element body layer 20*f*, the coil conductor layer 22*f*, and the first connecting conductor layer 24*f*. The element body layer 20*f* is provided with a defective portion RAf. The layer LAg is formed by mutually combining the element body layer 20*g*, the coil conductor layer 22*g*, and the first connecting conductor layer 24*g*. The element body layer 20*g* is provided with a defective portion RAg. The layer LAh is formed by mutually combining the element body layer 20*h*, the coil conductor layer 22*h*, and the first connecting conductor layer 24*h*. The element body layer 20*h* is provided with a defective portion RAh.

The layer LAi is configured by mutually combining the element body layer 20*i*, the coil conductor layer 22*i*, and the first connecting conductor layer 24*i*. The element body layer 20*i* is provided with a defective portion RAi. The layer LAj is configured by mutually combining the element body layer 20*j*, the coil conductor layer 22*j*, and the first connecting conductor layer 24*j*. The element body layer 20*j* is provided with a defective portion RAj. The layer LAk is configured by mutually combining the element body layer 20*k*, the coil conductor layer 22*k*, and the first connecting conductor layer 24*k*. The element body layer 20*k* is provided with a defective portion RAk.

The layer LA1 is configured by mutually combining the element body layer 20*l*, the coil conductor layer 22*l*, and the first connecting conductor layer 24*l*. The element body layer 20*l* is provided with a defective portion RAI. The layer LAm is configured by mutually combining the element body layer 20*m*, the coil conductor layer 22*m*, and the first connecting conductor layer 24*m*. The element body layer 20*m* is provided with a defective portion RAm. The layer LAn is configured by mutually combining the element body layer 20*n*, the coil conductor layer 22*n*, and the first connecting conductor layer 24*n*. The element body layer 20*n* is provided with a defective portion RAn.

The layer LAo is configured by mutually combining the element body layer 20*o*, the coil conductor layer 22*o*, and the first connecting conductor layer 24*o*. The element body layer 20*o* is provided with a defective portion RAo. The layer LAp is configured by mutually combining the element body layer 20*p*, the coil conductor layer 22*p*, and the first connecting conductor layer 24*p*. The element body layer 20*p* is provided with a defective portion RAp. The layer LAq is configured by mutually combining the element body layer 20*q*, the coil conductor layer 22*q*, and the first connecting conductor layer 24*q*. The element body layer 20*q* is provided with a defective portion RAq.

The layer LAr is configured by mutually combining the element body layer 20*r*, the coil conductor layer 22*r*, and the first connecting conductor layer 24*r*. The element body layer 20*r* is provided with a defective portion RAr. The layer LAs is configured by mutually combining the element body layer 20*s*, the coil conductor layer 22*s*, and the first connecting conductor layer 24*s*. The element body layer 20*s* is provided with a defective portion RAs. The layer LAt is configured by mutually combining the element body layer 20*t*, the coil conductor layer 22*t*, and the first connecting conductor layer 24*t*. The element body layer 20*t* is provided with a defective portion RAt. The layer LAu is configured by mutually combining the element body layer 20*u*, the coil conductor layer 22*u*, and the first connecting conductor layer 24*u*. The element body layer 20*u* is provided with a defective portion RAu.

The layer LAv is configured by mutually combining the element body layer 20*v*, the coil conductor layer 22*v*, the first connecting conductor layer 24*v*, and the second connecting conductor layer 26*v*. The coil conductor layer 22*v* and the second connecting conductor layer 26*v* are integrally formed. The element body layer 20*v* is provided with a defective portion RAv into which the coil conductor layer 22*v*, the first connecting conductor layer 24*v*, and the second connecting conductor layer 26*v* are fitted. The defective portion RAv has a shape corresponding to the coil conductor layer 22*v*, the first connecting conductor layer 24*v*, and the second connecting conductor layer 26*v*. The element body layer 20*v* and the entire coil conductor layer 22*v*, first connecting conductor layer 24*v*, and second connecting conductor layer 26*v* have a mutually complementary relationship. Although not illustrated, a plurality of the layers LAv are laminated in the present embodiment.

The layer LAw is configured by mutually combining the element body layer 20*w*, a first connecting conductor layer 24*w*, and a second connecting conductor layer 26*w*. The element body layer 20*w* is provided with a defective portion RAw into which the first connecting conductor layer 24*w* and the second connecting conductor layer 26*w* are fitted. The defective portion RAw has a shape corresponding to the first connecting conductor layer 24*w* and the second connecting conductor layer 26*w*. The element body layer 20*w* and the entire first connecting conductor layer 24*w* and second connecting conductor layer 26*w* have a mutually complementary relationship.

The layer LAx is configured by mutually combining the element body layer 20*x*, a first terminal electrode layer 28*x*, and a second terminal electrode layer 29*x*. The element body layer 20*x* is provided with a defective portion RAx into which the first terminal electrode layer 28*x* and the second terminal electrode layer 29*x* are fitted. The defective portion RAx has a shape corresponding to the first terminal electrode layer 28*x* and the second terminal electrode layer 29*x*. The element body layer 20*x* and the entire first terminal electrode layer 28*x* and second terminal electrode layer 29*x* have a mutually complementary relationship.

FIG. 12 is a plan view of the multilayer coil component illustrated in FIG. 7. FIG. 12 illustrates a state where the main surface 2*c* of the multilayer coil component 1A is viewed from the first direction D1. In FIG. 12, the element body 2 is indicated by a dashed line for convenience of description with the coil conductor layer 22*b* and the coil conductor layer 22*v* of the coil 5A not illustrated.

As illustrated in FIG. 12, in the multilayer coil component 1A, the coil 5A is disposed so as to face the fourth side 6Ad of the first connecting conductor 6A when viewed from the first direction D1. In the coil 5A that is viewed from the first direction D1, a side 5Aa facing the fourth side 6Ad is parallel to the fourth side 6Ad at the part that faces the fourth side 6Ad of the first connecting conductor 6A. In the present embodiment, a part of each of the coil conductor layer 22*d*, the coil conductor layer 22*g*, the coil conductor layer 22*j*, the coil conductor layer 22*m*, the coil conductor layer 22*p*, the coil conductor layer 22*s*, and the coil conductor layer 22*v* constituting the coil 5A faces the fourth side 6Ad of the first connecting conductor 6A. In each of the coil conductor layer 22*d*, the coil conductor layer 22*g*, the coil conductor layer 22*j*, the coil conductor layer 22*m*, the coil conductor layer 22*p*, the coil conductor layer 22*s*, and the coil conductor layer 22v, the side that faces the fourth side 6Ad of the first connecting conductor 6A is parallel to the fourth side 6Ad.

In the multilayer coil component 1A, the coil 5A is disposed so as to face the fourth side 7Ad of the second connecting conductor 7A when viewed from the first direction D1. In the coil 5A in the multilayer coil component 1A that is viewed from the first direction D1, a side 5Ab facing the fourth side 7Ad is parallel to the fourth side 7Ad at the part that faces the fourth side 7Ad of the second connecting conductor 7A. In the present embodiment, a part of each of the coil conductor layer 22*b*, the coil conductor layer 22*e*, the coil conductor layer 22*h*, the coil conductor layer 22*k*, the coil conductor layer 22*n*, the coil conductor layer 22*q*, and the coil conductor layer 22*t* constituting the coil 5A faces the fourth side 7Ad of the second connecting conductor 7A. In each of the coil conductor layer 22*b*, the coil conductor layer 22*e*, the coil conductor layer 22*h*, the coil conductor layer 22*k*, the coil conductor layer 22*n*, the coil conductor layer 22*q*, and the coil conductor layer 22*t*, the side that faces the fourth side 7Ad of the second connecting conductor 7A is parallel to the fourth side 7Ad. In the second connecting conductor 7A that is viewed from the first direction D1, the fourth side 7Ad of the second connecting conductor 7A and a part of each of the coil conductor layer 22*b*, the coil conductor layer 22*e*, the coil conductor layer 22*h*, the coil conductor layer 22*k*, the coil conductor layer 22*n*, the coil conductor layer 22*q*, and the coil conductor layer 22*t* planarly face each other.

As described above, in the multilayer coil component 1A according to the present embodiment, the first connecting conductor 6A connects one end of the coil 5A positioned on the main surface 2*d* side and the first terminal electrode 3 and extends along the first direction D1. In this configuration, the area (region) where the first connecting conductor 6A and the coil 5A face each other becomes large, and thus the effect of stray capacitance on characteristics may increase. In the multilayer coil component 1A, the coil 5A faces the fourth side 6Ad of the first connecting conductor 6A when viewed from the first direction D1. At the part that faces the fourth side 6Ad of the first connecting conductor 6A, the side 5Aa facing the fourth side 6Ad is parallel to the fourth side 6Ad. Accordingly, in the multilayer coil component 1A, a certain distance can be ensured between the first connecting conductor 6A and the coil 5A, and thus stray capacitance formation between the coil 5A and the first connecting conductor 6A can be suppressed. In addition, in this configuration, the diameter of the coil 5A can be increased. Further, in the multilayer coil component 1A, no corner portion is formed at the part where the coil 5A faces the first connecting conductor 6A. Accordingly, in the multilayer coil component 1A, a decline in direct current superimposition characteristics attributable to magnetic flux concentration in the corner portion can be suppressed. Accordingly, in the multilayer coil component 1A, the generation of stray capacitance can be suppressed and the characteristics can be improved.

The present invention is not necessarily limited to the embodiments of the present invention described above. Various modifications can be made within the gist thereof.

In the above embodiment, a form in which each of the first terminal electrode 3 and the second terminal electrode 4 has a rectangular shape has been described as an example. However, the shapes of the first terminal electrode 3 and the second terminal electrode 4 are not limited thereto.

In the above embodiments, a form in which the first connecting conductor 6, 6A and the second connecting conductor 7, 7A are disposed at diagonal positions has been described as an example. However, the first connecting conductor 6, 6A and the second connecting conductor 7, 7A may be disposed at other positions.

In the above embodiments, a form in which the cross sections of the first connecting conductor 6 and the second connecting conductor 7 are triangular and the cross sections of the first connecting conductor 6A and the second connecting conductor 7A are pentagonal has been described as an example. However, the first connecting conductor 6, 6A and the second connecting conductor 7, 7A may have at least a hypotenuse intersecting with the second direction D2 and the third direction D3 in a cross section orthogonal to the first direction D1. For example, the first connecting conductor 6, 6A and the second connecting conductor 7, 7A may have a semicircular shape or the like.

In the above embodiments, a form in which the second connecting conductor 7, 7A has a hypotenuse (third side 7*c*, fourth side 7Ad) has been described as an example. However, the second connecting conductor 7, 7A may have a hypotenuse-less shape (such as a columnar shape and a prismatic shape).

In the above embodiment, a form in which the coil 5 is configured by the coil conductor layers 12*b* to 12*v* has been described as an example. However, the number of coil conductor layers constituting the coil 5 is not limited to the above value. The same applies to the coil 5A.

Although an example of how to manufacture the multilayer coil component 1 has been described in the above embodiment, the multilayer coil component 1 may be manufactured by another method.

What is claimed is:

1. A multilayer coil component comprising:

an element body formed by laminating a plurality of insulator layers and having a pair of end surfaces facing each other, a pair of main surfaces facing each other, and a pair of side surfaces facing each other, one of the main surfaces being a mounting surface;

a coil disposed in the element body and having a coil axis extending along a first direction in which the pair of main surfaces face each other;

a first terminal electrode and a second terminal electrode connected to the coil and disposed on the mounting surface;

a first connecting conductor disposed outside the coil in the element body when viewed from the first direction and connecting one end of the coil positioned on the other main surface side and the first terminal electrode; and a second connecting conductor connecting the other end of the coil positioned on the one main surface side and the second terminal electrode, wherein the first connecting conductor extends along the first direction and has a first hypotenuse intersecting with a second direction as a facing direction of the pair of end surfaces and a third direction as a facing direction of the pair of side surfaces in a cross section orthogonal to the extension direction, and the coil faces the first hypotenuse of the first connecting conductor when viewed from the first direction and a side facing the first hypotenuse is parallel to the first hypotenuse at a part facing the first hypotenuse of the first connecting conductor.

2. The multilayer coil component according to claim 1, wherein the first terminal electrode has a rectangular shape when viewed from the first direction and is disposed such that each side is parallel to the end surface or the side surface, the first connecting conductor has at least three sides including the first hypotenuse, and the two sides of the first connecting conductor other than the first hypotenuse are parallel to the respective sides of the first terminal electrode.

3. The multilayer coil component according to claim 1, wherein the second connecting conductor extends along the first direction and has a second hypotenuse intersecting with the second direction and the third direction in a cross section orthogonal to the extension direction, and the coil faces the second hypotenuse of the second connecting conductor when viewed from the first direction and a side facing the second hypotenuse is parallel to the second hypotenuse at a part facing the second hypotenuse of the second connecting conductor.

4. The multilayer coil component according to claim 1, wherein each of the first connecting conductor and the second connecting conductor has a triangular shape in a cross section orthogonal to the extension direction.

* * * * *